3,150,530
MANUALLY CONTROLLED, MULTIPLE SPEED POWER TRANSMISSION MECHANISM

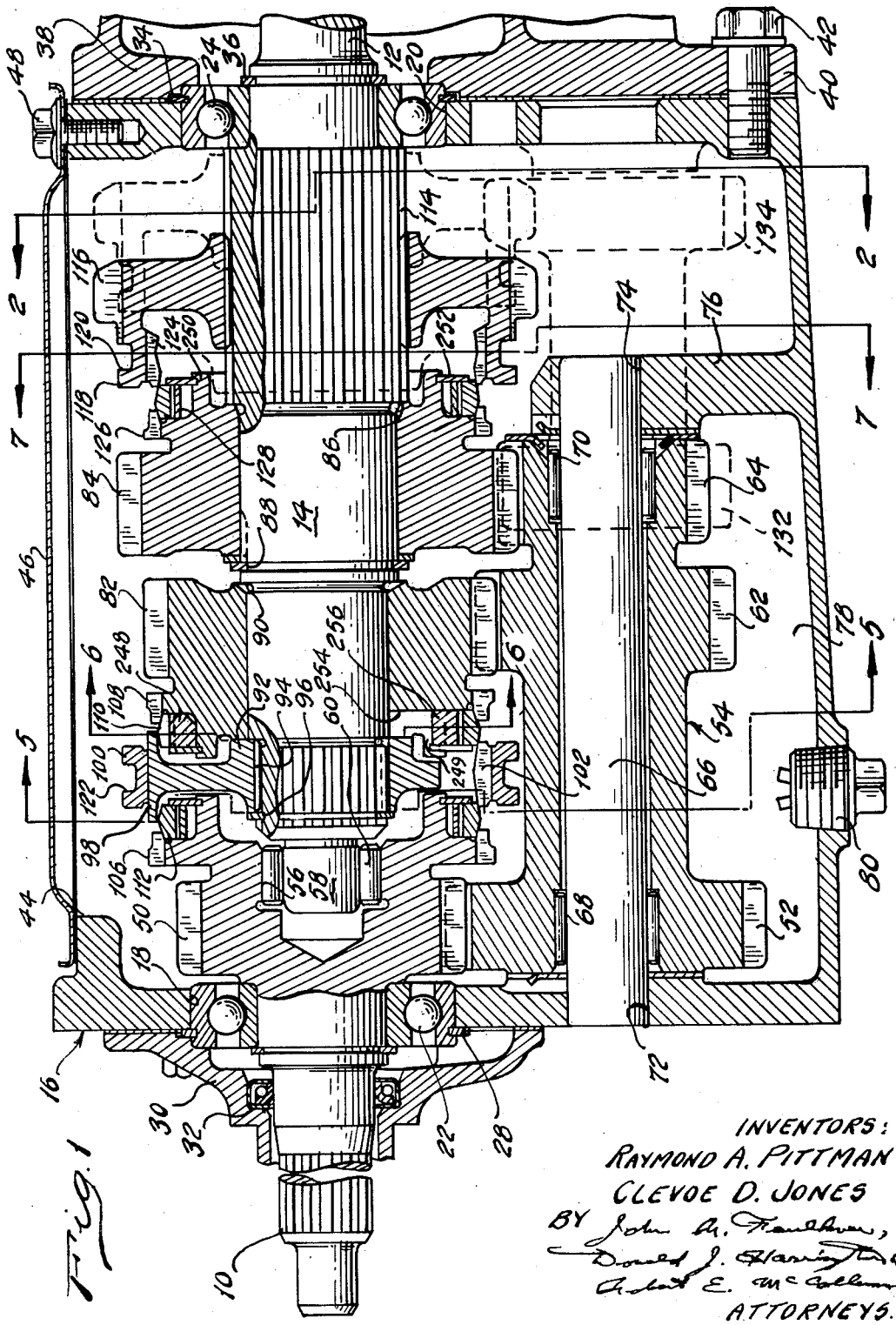

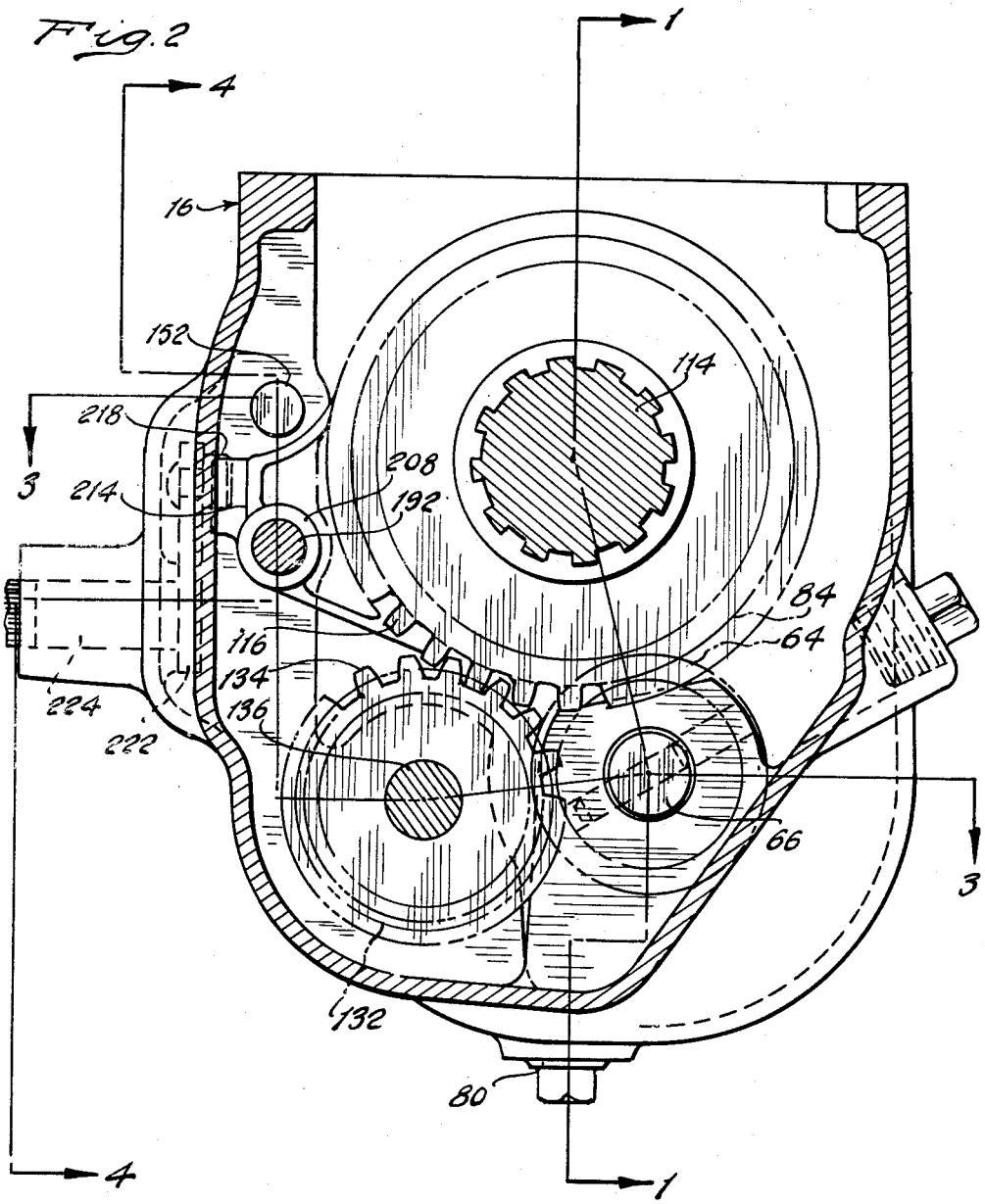

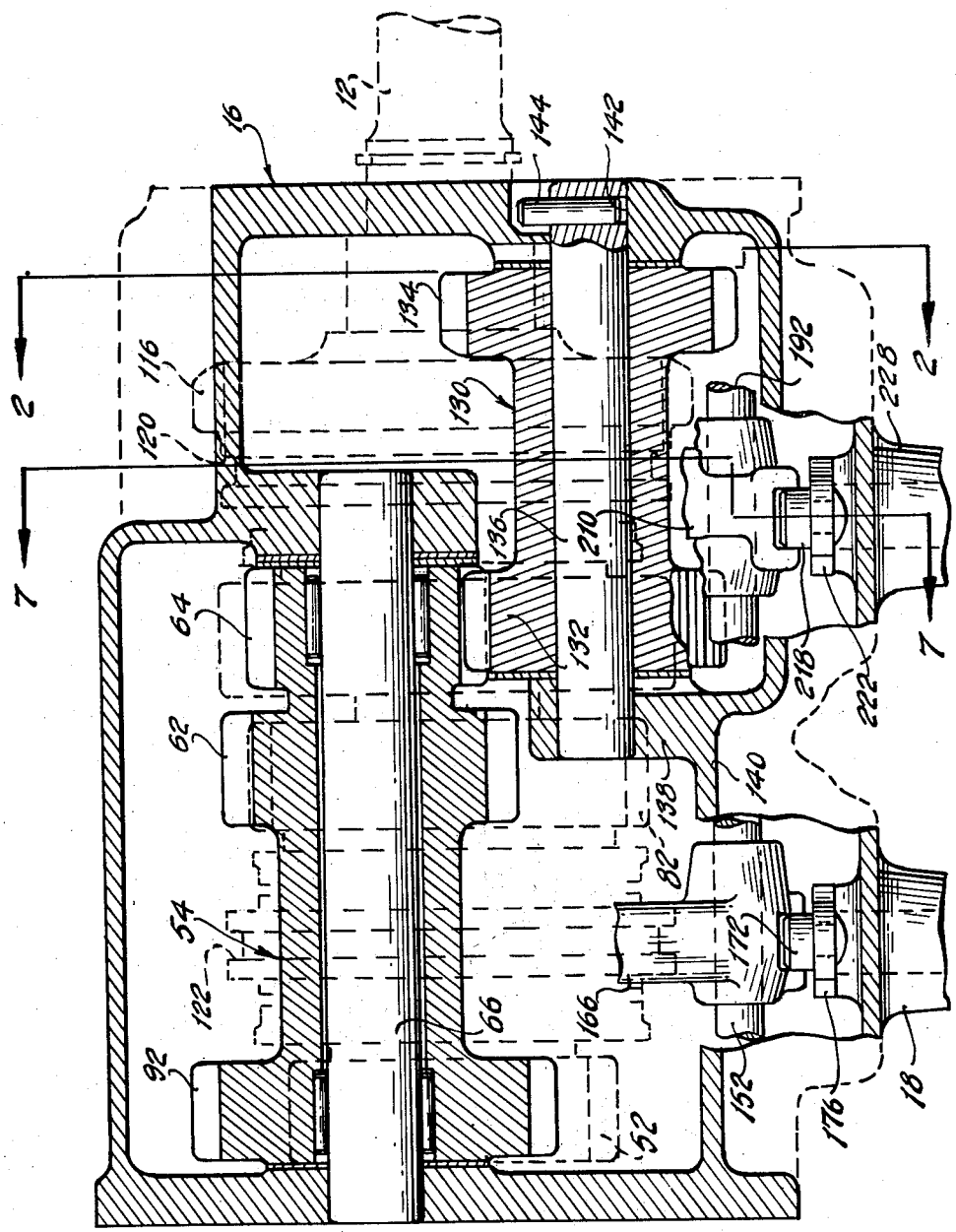

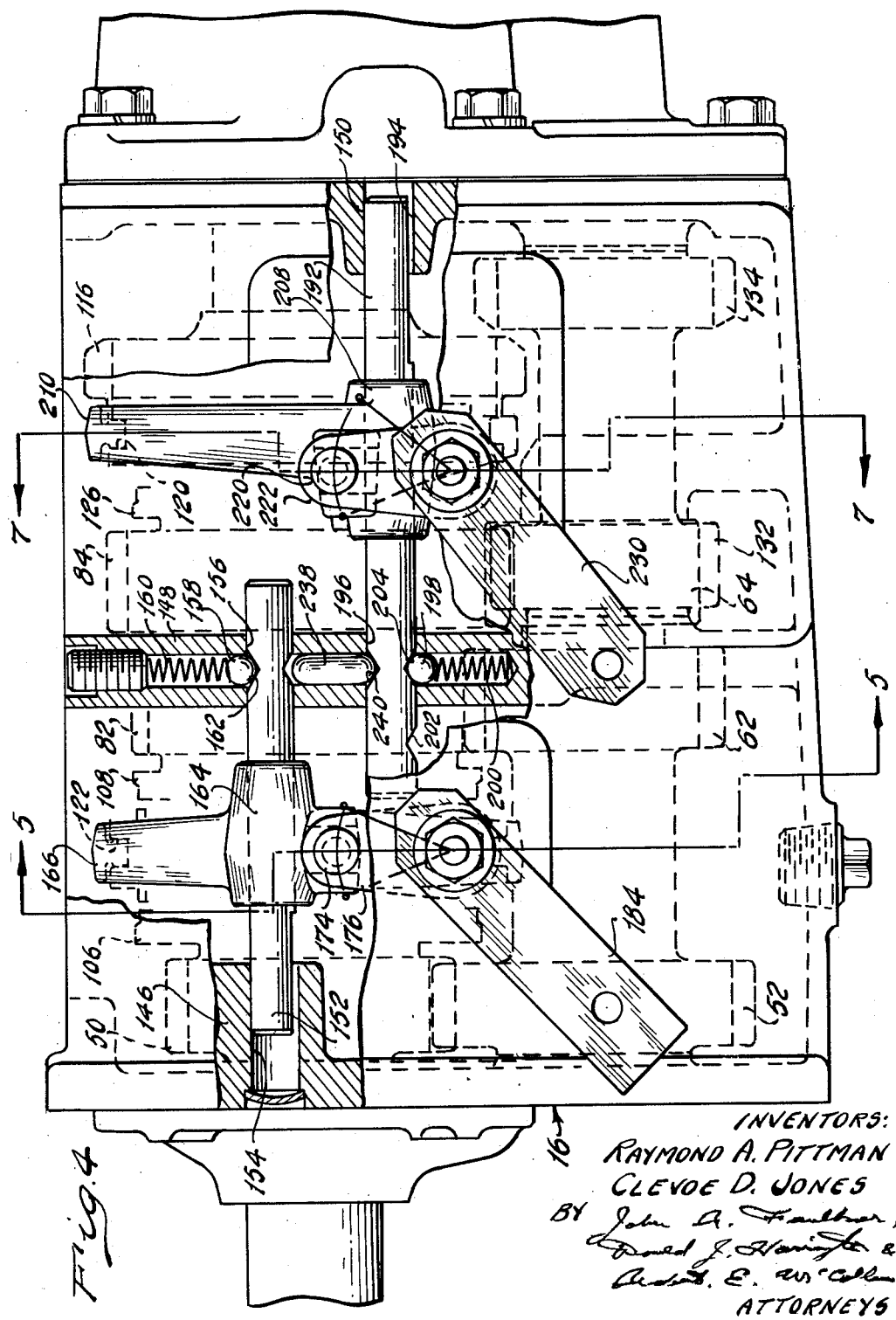

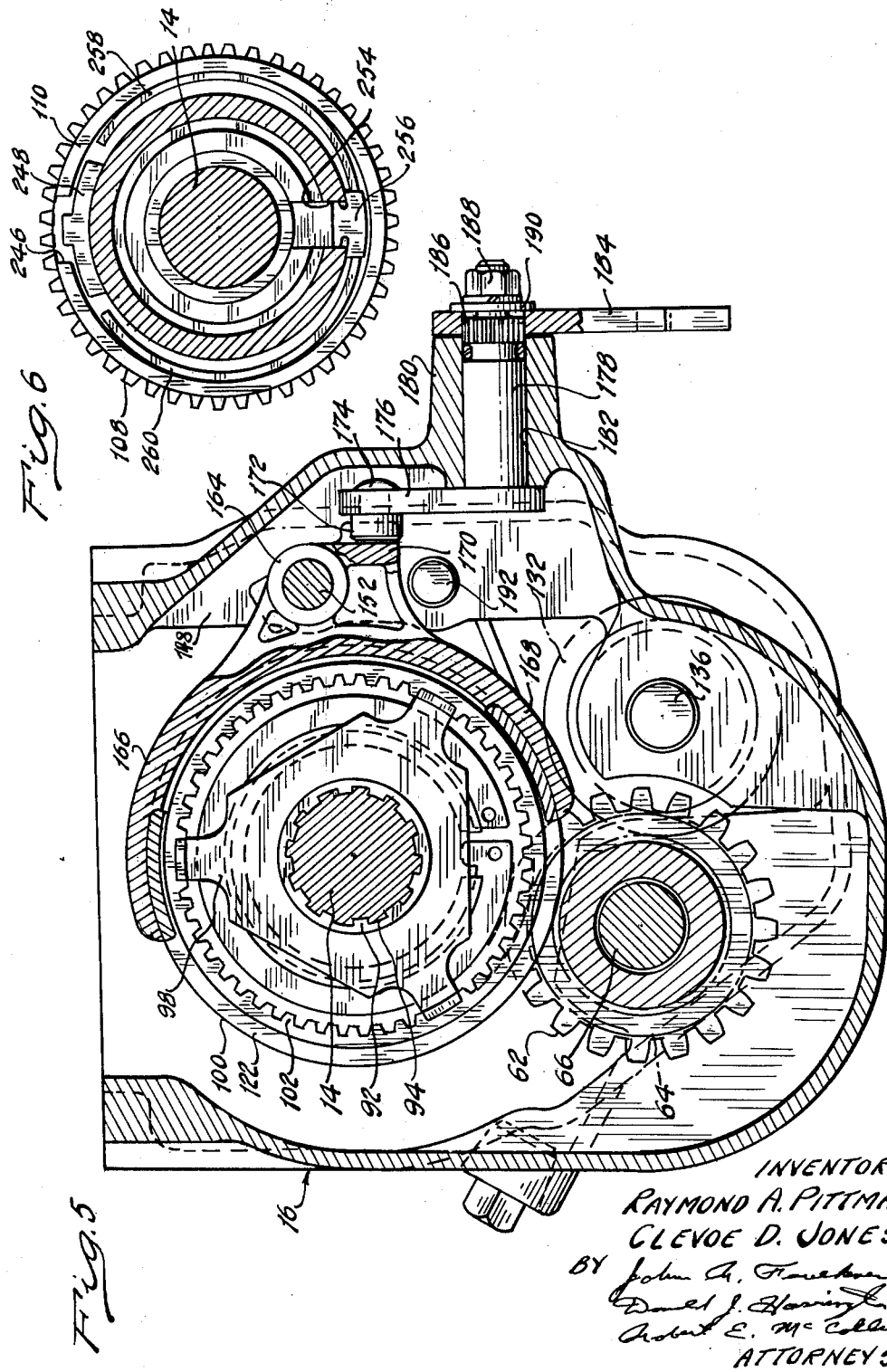

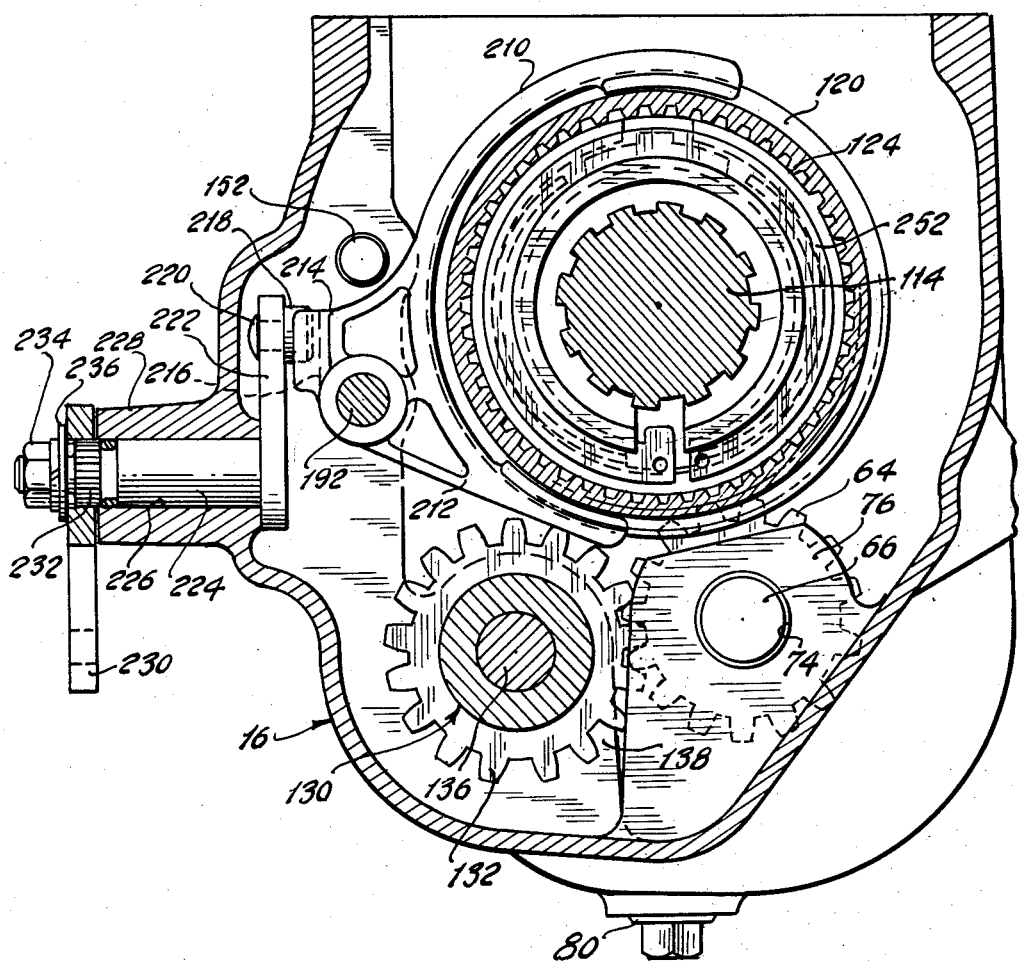

Raymond A. Pittman, Ann Arbor, and Clevoe D. Jones, Franklin, Mich., assignors to Ford Motor Company, Dearborn, Mich., a corporation of Delaware
Filed Aug. 17, 1962, Ser. No. 217,608
5 Claims. (Cl. 74—333)

Our invention relates generally to power transmission mechanisms and, more particularly, to a manually controlled, multiple speed power transmission mechanism that is adapted especially for use in automotive vehicle drivelines.

We are aware of various conventional manually controlled power transmission mechanisms that are used commercially in the automobile industry. One of these is a three-speed transmission having aligned power input and power output shafts, the power input shaft being connected releaseably to the vehicle engine by means of a neutral clutch. A cluster gear assembly is situated within a common casing with the main gear elements, the axis of rotation of the cluster gear assembly being situated in spaced, parallel relationship with respect to the common axis of the power input and power output shafts. A power input gear connected to the power input shaft continuously engages the gear element of the cluster gear assembly. An intermediate speed gear is journaled rotatably upon an intermediate shaft that in turn is connected to the power output shaft. The intermediate gear continuously engages the second gear element of the cluster gear assembly.

A low and reverse sliding gear is mounted upon the intermediate shaft of such a conventional transmission and is adapted to be moved axially. Relative rotation between the low and reverse gear and the intermediate shaft is inhibited. When the low and reverse gear is moved in one direction, it drivably engages the low speed gear element of the cluster gear assembly thus establishing a low speed power delivery path from the power input shaft to the power output shaft. If the low and reverse gear is shifted in the opposite direction, it drivably engages a reverse idler gear mounted for rotation about an axis parallel to the axis of the cluster gear assembly. The reverse idler gear drivably engages a reverse gear portion of the cluster gear assembly. When the low and reverse gear assumes this position, a reverse power flow path is completed from the power input shaft to the power output shaft.

A double acting synchronizer clutch mechanism is employed for selectively connecting the power input gear and the intermediate speed gear to the intermediate shaft. Either intermediate speed ratio operation or direct drive operation can be accomplished by appropriately positioning the synchronizer clutch mechanism.

The transmission arangement above described requires the use of a relatively long cluster gear assembly since sufficient space must be provided to accommodate the gear elements of the assembly. It is common practice to journal the cluster gear assembly for rotation about a countershaft that in turn is end supported in the transmission housing. Under heavy gear loads, there is a tendency for the cluster gear assembly to deflect. This tendency is increased as the spacing of the support points for the countershaft is increased. Also, there is no provision for synchronizing the engagement of the torque transmitting members that establish a low speed ratio torque delivery path. Undesirable gear clashing thus is experienced whenever relative rotation exists between the cluster gear assembly and the low and reverse gear.

The clearance that exists between the low and reverse gear and the reverse gear portion of the cluster gear assembly is very slight in conventional gear arrangements. The reverse gear ratio and the low speed ratio thus can be varied only slightly during the design of the mechanism. The relationship of the pitch diameters of the low and reverse gearing is dependent upon the clearance that is available. Flexibility in design to meet special performance requirements therefore is lacking.

In our improved transmission structure, we have eliminated the shortcomings of conventional manually controlled multiple speed automotive transmission mechanisms. This has been done by incorporating a gear arrangement that will provide the necessary torque multiplication in each of the plurality of drive ranges and which will accommodate a synchronizing action for each of the speed ratio changes.

Another feature of our invention resides in the reduced longitudinal dimensions of the cluster gear assembly thus reducing the tendency for deflection under heavy loads.

The provision of an improved transmission mechanism of the type above set forth being a principal object of our invention, it is another object of our invention to provide a multiple speed manually controlled automotive power transmission mechanism that is fully synchronized in each of the forward drive ranges.

It is another object of our invention to provide a multiple speed power transmission mechanism having a cluster gear assembly with a reduced number of gear elements, and wherein the longitudinal dimensions of the cluster gear assembly are reduced correspondingly.

It is another object of our invention to provide a multiple speed power transmission mechanism of the type above set forth wherein a reverse pinion is mounted for rotation about an axis that is in spaced parallel relationship with respect to the axis of the cluster gear assembly, said reverse pinion comprising two gear elements, one of which is in continuous meshing engagement with the gear element of the cluster gear assembly and the other of which is selectively engageable with a sliding gear journaled for rotation about the axis of the power output shaft.

It is a further object of our invention to provide a fully synchronized power transmission mechanism of simplified design and which has an increased torque transmitting capacity in comparison to conventional power transmission mechanisms of comparable dimensions.

It is a further object of our invention to provide a manually controlled multiple speed power transmission mechanism for automotive vehicles which has minimum space requirements in the automotive vehicle driveline.

It is a further object of our invention to provide a multiple speed ratio automotive vehicle transmission having shiftable torque transmitting members wherein the shifting motion of said members is obtained by means of shift rails movable in a direction which is parallel to the principal axis of the transmission.

For the purpose of more particularly describing our invention, reference will be made to the accompanying drawings wherein:

FIGURE 1 is a cross sectional view of our improved transmission structure and is taken along section line 1—1 of FIGURE 2;

FIGURE 2 is a transverse cross sectional view taken along section line 2—2 of FIGURE 1;

FIGURE 3 is a cross sectional plan view of our transmission mechanism taken along section line 3—3 of FIGURE 2;

FIGURE 4 is a longitudinal sectional view taken along a plane parallel to the plane of FIGURE 1. This plane is identified in FIGURE 2 by section line 4—4;

FIGURE 5 is a transverse cross sectional view taken along section line 5—5 of FIGURE 4 or section line 5—5 of FIGURE 1;

FIGURE 6 is a partial cross sectional view showing the synchronizer clutch and is taken along section line 6—6 of FIGURE 1; and FIGURE 7 is a transverse cross sectional view taken along section line 7—7 of FIGURE 4 or section line 7—7 of FIGURE 1.

Referring first to FIGURE 1, numeral 10 designates generally a power input shaft that may be splined or otherwise drivably connected to the driven portion of the neutral clutch mechanism, not shown. This neutral clutch mechanism may form a releaseable driving connection between the shaft 10 and a vehicle engine crankshaft. Reference character 12 designates a power output shaft which may be connected drivably to the vehicle traction wheels through a differential and axle assembly in the usual fashion. Numeral 14 designates an intermediate shaft that is connected integrally to power output shaft 12. Shafts 10, 14 and 12 are situated in aligned, coaxial relationship as indicated.

A transmission housing is designated generally by the reference character 16. It is formed with aligned bearing openings 18 and 20 to accommodate bearings 22 and 24. Power input shaft 10 is received within bearing 22. A snap ring 26 prevents movement of the shaft 10 relative to the bearing 22 and a snap ring 28 prevents movement of the bearing 22 relative to the housing 16. The bearing 22 is retained in place by a bearing cap member 30 having an extension for accommodating a fluid seal 32 disposed in sliding and sealing engagement with respect to the periphery of shaft 10.

Power output shaft 12 is journaled within bearing 24. Movement of the bearing 24 relative to the casing 16 is inhibited by snap ring 34 and movement of the shaft 12 relative to the bearing 24 is inhibited by snap ring 36. The bearing is retained by a boss 38 that forms a part of a tailshaft housing 40. The housing 40 is secured to the main housing 16 by bolts 42.

The upper end of the housing 16 is formed with an opening 44 that is covered by a cover plate 46 secured to the housing 16 by bolts 48. Cover plate 46 can be removed to permit access to the torque transmitting gear members subsequently to be described.

A power input gear 50 is connected to power input shaft 10 and is in continuous meshing engagement with a gear element 52 of a cluster gear assembly identified generally by reference character 54. Gear 50 is formed with a central bearing opening 56 that receives a reduced diameter end 58 of the intermediate shaft 14. The end 58 is piloted within bearing opening 56 by suitable pilot bearing structure 60.

The cluster gear assembly 54 includes also gear element 62 and a gear element 64. Cluster gear assembly 54 is in the form of a sleeve shaft which is journaled for rotation about a countershaft 66 by spaced bearings 68 and 70. Countershaft 66 in turn is end supported by the housing 16. An opening 72 is formed in the housing 16 for receiving and supporting one end of shaft 66 and an opening 74 is formed in a boss 76 for receiving and supporting the other end of shaft 66. Boss 76 in turn is formed integrally with and forms a part of housing 16. The lower region of the housing 16 defines an oil sump 78. An oil drain plug 80 is provided for draining the sump 78. Gears 82 and 84 are journaled for rotation about intermediate shaft 14. Gear 82 is in continuous meshing engagement with gear element 62 and gear 84 is in continuous meshing engagement with gear element 64. Gear 84 is positioned against a shoulder 86 formed on the intermediate shaft 14. It is positioned also by a snap ring 88.

Gear 82 is positioned against a shoulder 90 formed on the intermediate shaft 14. It is positioned also against a synchronizer clutch hub 92 that in turn is splined at 94 at one end of the intermediate shaft 14. The hub 92 is axially positioned by a snap ring 96.

The synchronizer clutch hub 92 has extended portions 98 which support and guide a synchronizer sleeve 100 having internal synchronizer clutch teeth 102. The extremities of the portions 98 are received within cooperating internal grooves in the sleeve 100 thus accommodating axial sliding movement of the sleeve 100 with respect to the hub 92 while inhibiting relative rotary motion therebetween.

Gear 50 is formed with a flange portion 104 which carries external clutch teeth 106. In a similar fashion, external clutch teeth 108 are carried by a flange portion of gear 82. If the sleeve 100 is shifted in a left-hand direction as viewed in FIGURE 1, the teeth 102 mesh with teeth 106 thus establishing a driving connection between intermediate shaft 14 and gear 50. In a similar fashion, if the sleeve 100 is shifted in a right-hand direction as viewed in FIGURE 1, teeth 102 engage teeth 108 thus establishing a positive driving connection between gear 82 and intermediate shaft 14.

A split synchronizer ring 110 is situated between sleeve 100 and teeth 108 to establish synchronism between shaft 14 and gear 82 prior to engagement of teeth 102 and 108. In a similar fashion, a split synchronizer ring 112 is provided between element 100 and teeth 106 to establish synchronism between gear 50 and intermediate shaft 14 prior to engagement of teeth 102 with teeth 106. The mode of operation of the synchronizer mechanism will be described more particularly with reference to FIGURE 6. This description, however, can be supplemented by referring to the synchronizer clutch construction disclosed in U.S. Patent No. 2,932,373.

Intermediate shaft 14 is formed with longitudinally extending splines 114 that establish a driving connection between a sliding gear 116 and intermediate shaft 14. Relative rotation of gear 116 with respect to shaft 14 is inhibited, although gear 116 is capable of being moved from one axial position to another.

Gear 116 is formed with an extension 118 in which is formed an annular groove 120 for receiving a shifter fork that will be described subsequently. In a similar fashion, sleeve 100 for the synchronizer clutch structure is formed with an annular groove 122 for receiving another shifter fork which will subsequently be described.

The inner periphery of extension 118 is formed with synchronizer clutch teeth 124. These teeth are adapted to engage external clutch teeth 126 carried by gear 84. Teeth 124 and 126 drivably engage each other when the gear 116 is shifted to a left-hand position as viewed in FIGURE 1.

A synchronizer clutch ring 128 is carried by gear 84 and it functions to establish synchronism between gear 84 and shaft 14 prior to engagement of the teeth 124 and 126. The synchronizer clutch structures for gear 84, gear 82 and gear 50 are similar in form and their mode of operation will be apparent from the subsequent description of FIGURES 5 and 6.

Referring next to FIGURES 2, 3 and 7, we have illustrated a split reverse pinion identified generally by reference character 130. This pinion is in the form of a cluster gear having two gear elements 132 and 134. Pinion 130 is formed with an axial bore for receiving a supporting shaft 136. This shaft 136 is end supported by the housing 16 and by a boss 138 which is formed integrally with the housing 16. The boss 138 is formed with an opening 140 for receiving one end of shaft 136 and an end wall of housing 16 is formed with an opening 142 for receiving the other end of shaft 136. A locking pin 144 can be received in a cooperating recess in the end wall of housing 16 and in a mating transverse opening in shaft 136 for retaining the shaft 136 in place after assembly.

Gear element 132 of the reverse pinion 130 is situated in continuous driving engagement with gear element 64 of the main cluster gear assembly 54.

Gear element 134 drivably engages gear 116 when the latter is shifted in a right-hand direction as viewed in FIGURE 1. When it is shifted in this fashion, a reverse torque delivery path is established between the power input shaft 10 and power output shaft 12.

It will be observed in FIGURE 1 that the gear elements 52, 62 and 64 are formed with progressively decreasing pitch diameters. The corresponding pitch diameters of gears 50, 82 and 84 progressively increase. To establish the lowest speed ratio operation, gear 116 is shifted in a left-hand direction as viewed in FIGURE 1 to establish a driving connection between gear 84 and intermediate shaft 14. Engine power then is delivered from shaft 10, through gear 50, through gear element 52, gear element 64, gear 84 and shaft 114 to the power output shaft 12.

To establish intermediate speed ratio operation, gear 116 is returned to the position shown in FIGURE 1 and synchronizer clutch sleeve 100 is shifted in a right-hand direction to lock gear 82 to the intermediate shaft 14. Engine power is delivered from power input shaft 10 to the power output shaft 12 through gear 50, gear element 52, gear element 62, gear 82 and intermediate shaft 14.

High speed direct drive operation can be established by moving the clutch sleeve 100 from the right-hand position to the left-hand position, thus establishing a direct driving connection between power input shaft 10 and intermediate shaft 14. Power then is transferred directly from the engine to the power output shaft through shafts 10 and 14.

As best observed in FIGURE 4, the housing 16 is provided with spaced bosses 146, 148 and 150. These bosses extend inwardly from the interior surface of the housing 16 as best seen in FIGURES 5 and 7. A first shift rail 152 is slidably supported in cooperating openings formed in bosses 146 and 148. These openings are identified by reference characters 154 and 156. A detent element in the form of a ball is indicated at 158 and is spring biased by a spring 160 into engagement with a recess 162 formed in shift rail 152. When the rail is positioned as shown, the synchronizer clutch sleeve 100 is in a neutral position.

A collar 164 is secured to the shift rail 152 as indicated in FIGURES 4 and 5. Fingers 166 and 168 extend from the collar 164 and the extremities thereof are received within the aforementioned groove 122 formed in the sleeve 100. As the fingers 168 and 166 are shifted in a longitudinal direction, the clutch sleeve 100 is positioned appropriately to establish either intermediate speed ratio drive or direct drive, as previously described.

Collar 164 carries also a portion 170 having a groove within which is positioned an actuator roller 172 that is carried by a pin 174. This pin in turn is carried by an arm 176 supported by a rocker shaft 178 journaled within a boss 180. This boss 180 extends outwardly of the casing and forms an integral part thereof. It is received within a bored opening 182.

A shift lever 184 is splined to a splined portion 186 of the shaft 178. Lever 184 is held in place by a nut 188 and a cooperating washer 190. The extended end of shaft 178 is threaded to accommodate the nut 188.

As the lever 184 is rotated, the arm 176 oscillates about the axis of shaft 178. The roller 172 thus will ride vertically upward and downward in the cooperating groove formed in the portion 170. The arm 176, however, will cause the collar 164 and the shift rail 152 to slide in the direction of the axis of the intermediate shaft 14. Since the motion of the fingers 166 and 168 is entirely in the direction of the axis of shaft 14 and there is no displacement in a direction transverse to this axis, the groove 122 and the sleeve 100 can be made relatively shallow and the thickness of the sleeve 100 thus can be reduced accordingly.

The shifting mechanism for the gear 116 is best illustrated in FIGURES 4 and 7. It includes a second shift rail 192 slidably supported in cooperating openings 194 and 196 of the bosses 148 and 150, respectively. A detent ball 198 is spring urged by a spring 200 into engagement with one of two detent recesses 202 and 204 formed in rail 192. When the rail 192 is positioned as shown in FIGURE 4, the gear 116 is positioned in a neutral position as indicated in FIGURE 1.

The rail 192 carries a collar 208 to which are secured shifter fork fingers 210 and 212. The extremities of the fingers 210 and 212 are received within groove 120 of the extension 118 carried by gear 116. Collar 208 has formed thereon a portion 214 having a verticle groove 216 in which is positioned an actuator roller 218. A pin 220 carried by arm 222 is received within the groove 216. Arm 222 in turn is secured to rocker shaft 224 journaled within an opening 226 in a boss 228 formed on the exterior of housing 16.

A shift lever 230 is splined to a splined portion 232 of shaft 224. A retainer nut 234 and a washer 236 are provided for retaining lever 230 upon shaft 224. The end of shaft 224 is threaded to accommodate the nut 234.

The levers 184 and 230 are interconnected to a manually controlled gear shift mechanism in the usual fashion so that the operator of the vehicle can position appropriately the levers 184 and 230 in sequence with the operation of the neutral clutch to establish one gear ratio or another as desired.

As in the case of the shifter fork fingers for the synchronizer clutch sleeve 100, the shifter fork fingers 210 and 212 for the gear 116 move only in the direction of the axis of shaft 14. There is no transverse displacement of the shifter fork fingers during a shifting movement of the gear 116. The rise and fall of the arm 222 during shifting motion of the lever 230 is accommodated by the rolling connection of the roller 218 and the cooperating groove 216 of the collar portion 214.

An interlock for the rails 152 and 192 is provided. This includes an interlock element 238 slidably positioned in a cooperating opening in boss 148. The ends of element 238 are adapted to engage recesses 240 and 242 in the rails 192 and 152, respectively. When rail 152 is moved in either a left-hand direction or a right-hand direction, the element 238 will be moved downwardly as shown in FIGURE 4 thus inhibiting movement of rail 192. It therefore is impossible to actuate gear 116 to either the low or reverse drive positions while the transmission is conditioned for either direct drive or intermediate speed ratio operation. In a similar fashion, when rail 192 is moved in either a right-hand direction or a left-hand direction, element 238 engages recess 242 to inhibit movement of rail 152. It therefore is impossible to shift the transmission to either direct drive operation or intermediate speed ratio operation while the gear 116 assumes either the low speed drive position or the reverse drive position.

For the purpose of describing very briefly the mode of operation of the three synchronizing clutch structures, the synchronizer clutch structure for gear 82 will be described with reference to FIGURES 5 and 6.

As best seen in FIGURE 5, the synchronizer clutch sleeve 100 is slidably positioned upon the extended portions 98 of the hub 92. The extremities of these portions 98 are elongated as viewed in FIGURE 1. When the sleeve 100 is shifted in a right-hand direction as viewed in FIGURE 1, the inner surface of the teeth 102 will engage the outer peripheral surface of the split synchronizer ring 110. The outer periphery of ring 110 is crowned so that when the teeth 102 engage the same, there will be a tendency to compress the ring 110.

As viewed in FIGURE 6, the ends of the synchronizer ring form a gap 246. Situated within the gap is an abutment 248 slidably positioned upon the outer peripheral surface of extension 249 carried by gear 82. This extension 249 corresponds in function to an extension 250 carried by gear 84, a ring 128 corresponding to ring 110 surrounds extension 250. The construction and mode of operation of the synchronizer for gear 84 is similar to that of the synchronizers for gear 82 and gear 50.

As best seen in FIGURE 1, extension 250 is formed with a snap ring groove for receiving a snap ring 252 which axially positions the ring 128 under overlapping projections of the teeth 126.

Extension 250 is formed with a notch 254 within which is situated an anchor member 256. Disposed between anchor member 256 and one end of the abutment 248 is an arcuate spring segment 258 that is adapted to engage the inner periphery of the ring 110. A similar arcuate spring segment 260 is located between the anchor 256 and the other side of the abutment 248.

If it is assumed that the gear 116 is rotating in a clockwise direction as viewed in FIGURE 6, a shifting movement of the teeth 124 into engagement with the periphery of ring 110 will cause the ring 110 to shift so that one end will engage the abutment 248 to urge the latter in a clockwise direction. The right-hand end of abutment 248 then will engage one end of the arcuate segment 258 and the tangential forces acting upon the ring 110 then will be transmitted through the anchor 256 into the extension 250. This will tend to accelerate the gear 84. This accelerating force continues until the gear 84 is brought into synchronism with respect to gear 116.

When the relative rotation of the gear 116 and the gear 84 is opposite in direction, the abutment 248 will engage one end of the arcuate segment 260. The tangential forces will be transmitted from the ring 110 through the arcuate segment 260 into the anchor 256 to cause the gear 84 to accelerate in the other direction.

The arcuate segments 258 and 260 provide a so-called servo action or a regenerative torque feedback so that the accelerating forces for any given shifting effort applied to the gear 116 are magnified.

As previously indicated, a complete description of the synchronizing mechanism can be obtained by referring to U.S. Patent No. 2,932,373.

Having thus described a preferred embodiment of our invention, what we claim and desire to secure by U.S. Letters Patent is:

1. A power transmission mechanism comprising a power input shaft and a power output shaft arranged in axial alignment, an intermediate shaft disposed between said power input shaft and said power output shaft and connected to said power output shaft, torque transmitting gears carried by said intermediate shaft, means for connecting drivably one of said gears to said intermediate shaft, said connecting means being adapted to permit axial sliding movement of said one gear with respect to said intermediate shaft, a power input gear connected to said power input shaft, a cluster gear assembly having gear elements engageable with said power input gear and the other torque transmitting gears, synchronizer clutch means for clutching selectively said other torque transmitting gears and said power input gear to said intermediate shaft, and a reverse drive pinion mounted for rotation about an axis parallel to the axis of said intermediate shaft, said reverse drive pinion including a pair of gear portions, one gear portion being in continuous meshing engagement with one gear element of said cluster gear assembly, the other gear portion of said reverse drive pinion being in engagement with said one gear upon movement of the latter to one axial position.

2. A power transmission mechanism comprising a power input shaft and a power output shaft arranged in axial alignment, a power input gear connected to said power input shaft, an intermediate shaft connected to said power output shaft and disposed between said power input shaft and said power output shaft, torque transmitting gears carried by said intermediate shaft, means for drivably connecting one of said gears to said intermediate shaft, said connecting means being adapted to permit axial sliding movement of said one gear with respect to said intermediate shaft, a cluster gear assembly mounted for rotation about an axis parallel to the axis of said intermediate shaft, said cluster gear assembly having gear elements engageable with said power input gear and the other torque transmitting gears, a first synchronizer clutch means for connecting one of said other torque transmitting gears to said intermediate shaft and including cooperating clutch elements carried by said one of said other torque transmitting gears and said one gear, other synchronizer clutch means disposed between said power input gear and a second of said other torque transmitting gears for connecting selectively sadi power input gear and said second of said other torque transmitting gears to said intermediate shaft, and a reverse drive pinion having two gear portions mounted for rotation about an axis parallel to the axis of said cluster gear assembly and said intermediate shaft, one gear portion engaging continuously one gear element of said cluster gear assembly, and the other gear portion being engageable with said one gear upon movement thereof to one axial position, said one gear effecting clutching engagement to said one of said other gears upon movement thereof to another axial position.

3. A power transmission mechanism comprising a power input shaft and a power output shaft arranged in axial alignment, a power input gear connected to said power input shaft, an intermediate shaft connected to said power output shaft and disposed between said power input shaft and said power output shaft, torque transmitting gears carried by said intermediate shaft, means for drivably connecting one of said gears to said intermediate shaft, said connecting means being adapted to permit axial sliding movement of said one gear with respect to said intermediate shaft, a cluster gear assembly mounted for rotation about an axis parallel to the axis of said intermediate shaft, said cluster gear assembly having gear elements engageable with said power input gear and the other torque transmitting gears, a first synchronizer clutch means for connecting one of said other torque transmitting gears to said intermediate shaft and including cooperating clutch elements carried by said one of said other torque transmitting gears and said one gear, other synchronizer clutch means disposed between said power input gear and a second of said other torque transmitting gears for connecting selectively said power input gear and said second of said other torque transmitting gears to said intermediate shaft, a reverse drive pinion having two gear portions mounted for rotation about an axis parallel to the axis of said cluster gear assembly and said intermediate shaft, one gear portion engaging continuously one gear element of said cluster gear assembly, and the other gear portion being engageable with said one gear upon movement thereof to one axial position, said one gear effecting clutching engagement of said one of said other gears upon movement thereof to another axial position, and two shift rails mounted in a direction parallel to the axis of said intermediate shaft, each shift rail carrying a shifter fork engageable with an axially movable portion of a separate synchronizer clutch means whereby a shifting effort applied to said shift rails effects clutching action of said clutch means and movement of said one gear into and out of engagement with said reverse drive pinion 4. A power transmission mechanism comprising a housing, a power input shaft and a power output shaft arranged in axial alignment in said housing, an intermediate shaft disposed between said power input shaft and said power output shaft, said intermediate shaft being connected to said power output shaft, torque transmitting gears carried by said intermediate shaft, means for drivably connecting one of said gears to said intermediate shaft, said connecting means being adapted to permit axial relative sliding movement of said one gear relative to said intermediate shaft in the direction of the axis thereof, a power input gear connected to said power input shaft, a cluster gear assembly having gear elements engageable with the power input gear and the other torque transmitting gears, said cluster gear assembly being end supported at spaced locations in said housing, cluster gear bearings at each spaced location, said housing including a boss on the interior thereof for supporting one cluster gear bearing, a reverse drive pinion mounted for rotation about an axis parallel to the axis of said cluster gear assembly, and another boss in said housing supporting one end of said reverse drive pinion whereby a gear portion of said reverse drive pinion is situated in continuous meshing engagement with a gear element of said cluster gear assembly.

5. A power transmission mechanism comprising a housing, a power input shaft and a power output shaft arranged in axial alignment in said housing, an intermediate shaft disposed between said power input shaft and said power output shaft, said intermediate shaft being connected to said power output shaft, torque transmitting gears carried by said intermediate shaft, means for drivably connecting one of said gears to said intermediate shaft, said connecting means being adapted to permit sliding movement of said one gear relative to said intermediate shaft in the direction of the axis thereof, a power input gear connected to said power input shaft, a cluster gear assembly having gear elements engageable with said power input gear and the other of said torque transmitting gears, said cluster gear assembly being end supported at spaced locations in said housing, said housing including a boss on the interior thereof for supporting one cluster gear end, a reverse drive pinion mounted for rotation about an axis parallel to the axis of said cluster gear assembly, and another boss in said housing supporting one end of said reverse drive pinion whereby a gear portion of said reverse drive pinion is situated in continuous meshing engagement with a gear element of said cluster gear assembly, said power input shaft being journaled at one end of said housing, said intermediate shaft being journaled at one end thereof in the other end of said housing, the other end of said intermediate shaft being journaled within said power input gear, said bosses being located intermediate said power input gear and the other end of said housing.

References Cited in the file of this patent
UNITED STATES PATENTS

| | | |
|---|---|---|
| 2,045,011 | Griswold | June 23, 1936 |
| 3,040,595 | Osswald | June 26, 1962 |